United States Patent [19]
Gray et al.

[11] Patent Number: 5,207,442
[45] Date of Patent: May 4, 1993

[54] TOY VEHICLE WITH TRACK AND ROLLER DRIVE TRAIN

[75] Inventors: Frank Gray, St. Louis; LeRoy Stienbarger, Licking, both of Mo.

[73] Assignee: Champion Toy Company, St. Louis, Mo.

[21] Appl. No.: 677,351

[22] Filed: Mar. 22, 1991

Related U.S. Application Data

[63] Continuation of Ser. No. 435,336, Nov. 13, 1989, abandoned.

[51] Int. Cl.$^5$ ............................................. B62M 1/04
[52] U.S. Cl. ..................................... 280/256; 280/253; 74/48
[58] Field of Search ............... 280/210, 220, 221, 252, 280/253, 256; 74/47, 48

[56] References Cited

U.S. PATENT DOCUMENTS

| 594,980 | 12/1897 | Booth et al. | 280/253 |
| 2,108,868 | 2/1938 | Rumsey | 280/256 X |
| 4,258,485 | 3/1981 | Gof | 280/253 |
| 4,880,249 | 11/1989 | Gray et al. | 280/253 |

FOREIGN PATENT DOCUMENTS

| 43735 | of 1887 | Austria | 280/256 |
| 0353813 | 4/1905 | France | 280/210 |
| 867669 | 11/1941 | France | 280/256 |
| 0271550 | 10/1950 | Switzerland | 280/256 |
| 0002498 | of 1869 | United Kingdom | 280/256 |
| 24085 | of 1898 | United Kingdom | 280/256 |

*Primary Examiner*—Margaret A. Focarino
*Assistant Examiner*—Anne Marie Boehler
*Attorney, Agent, or Firm*—Rogers, Howell & Haferkamp

[57] ABSTRACT

A toy vehicle for a child includes a track and roller drive train for propelling the vehicle. Each of a pair of pedal arms is pivotally mounted at its forward end and has a split track mounted at the rear end thereof which rides on a roller mounted on either side of the axle. As the pedal arms are reciprocated by a rider, the tracks drive the rollers and axle with the gap between ramps of the track allowing the track to straddle the axle at the bottom of each stroke. The track may be generally curvilinear, or compound angled to balance the torque generated by each stroke in either the forward or rearward direction, and to also provide a smoother driving action through substantially 180° of axle rotation with each stroke.

25 Claims, 4 Drawing Sheets

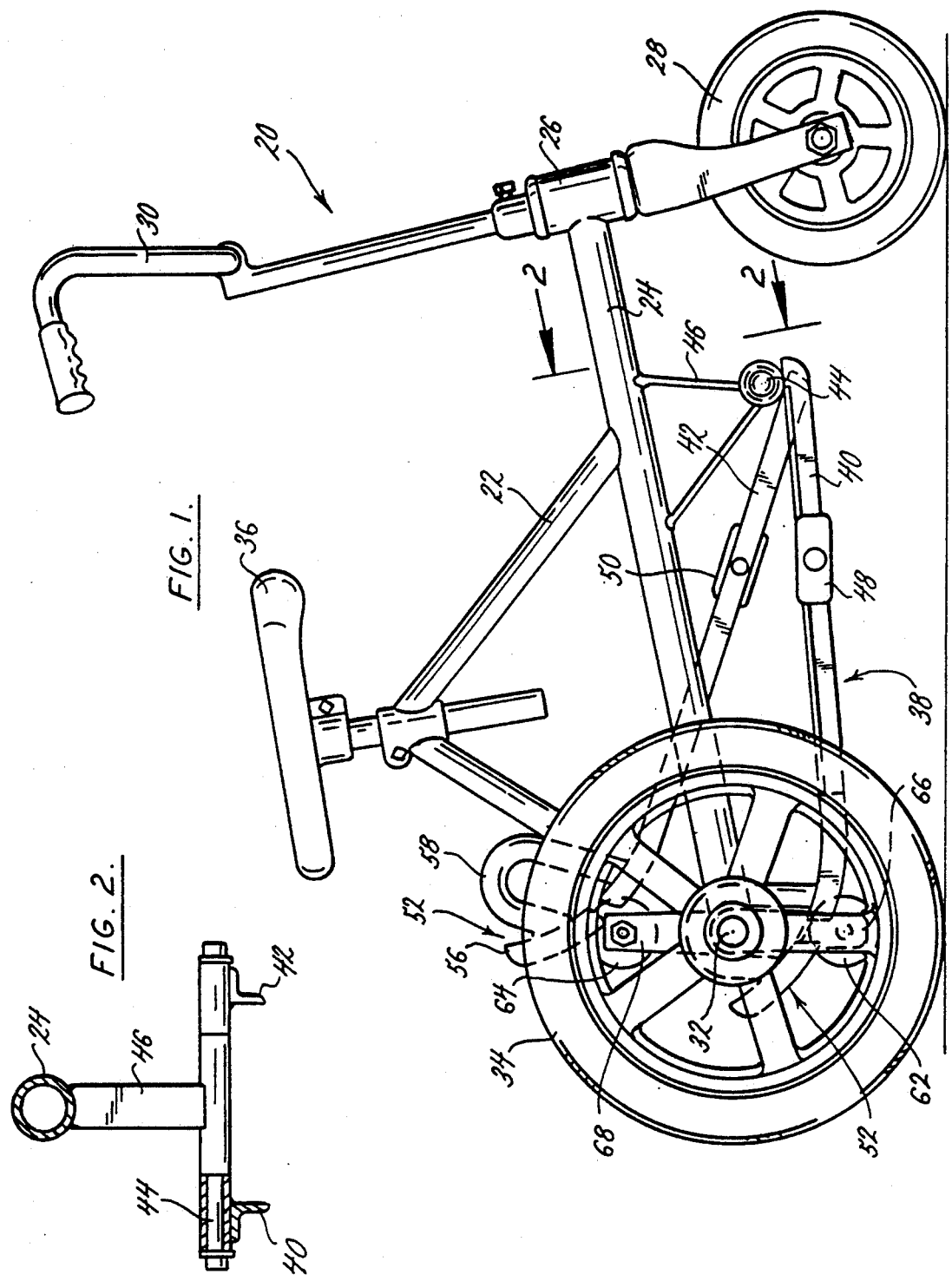

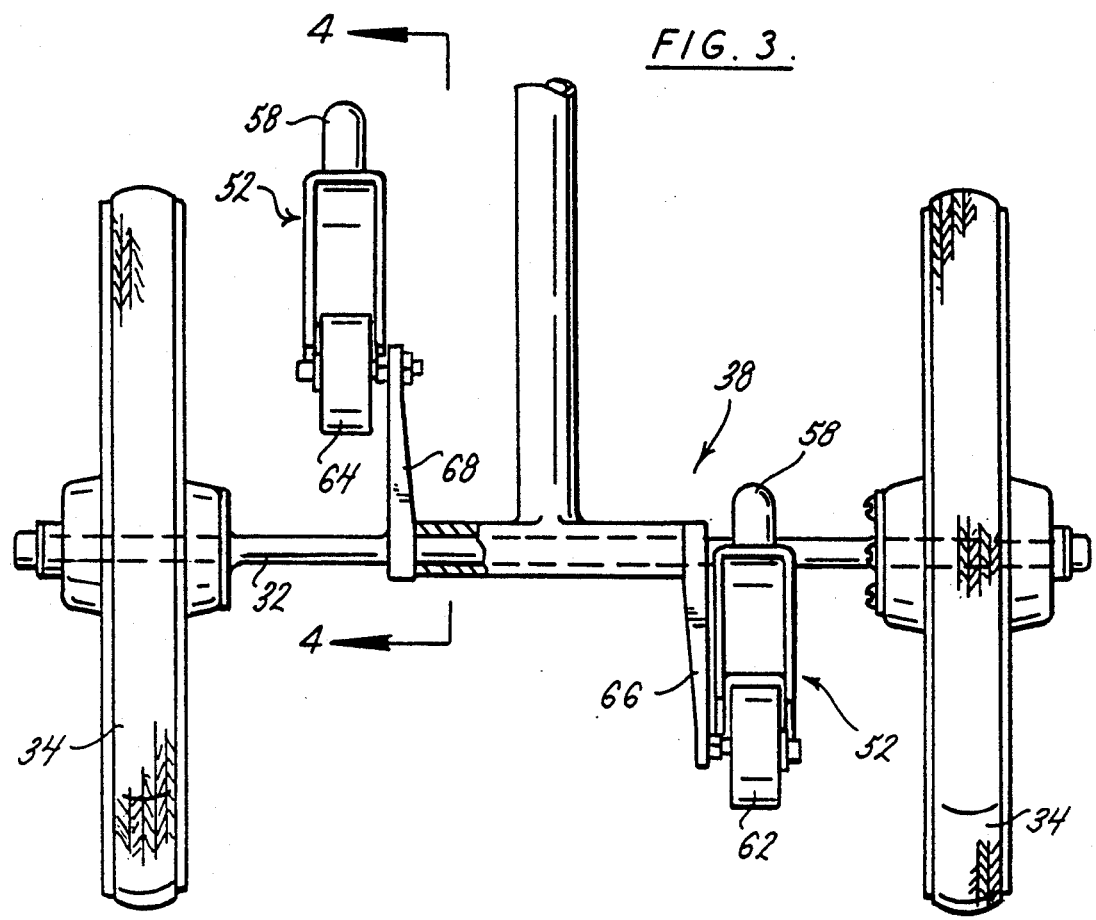
FIG. 3.
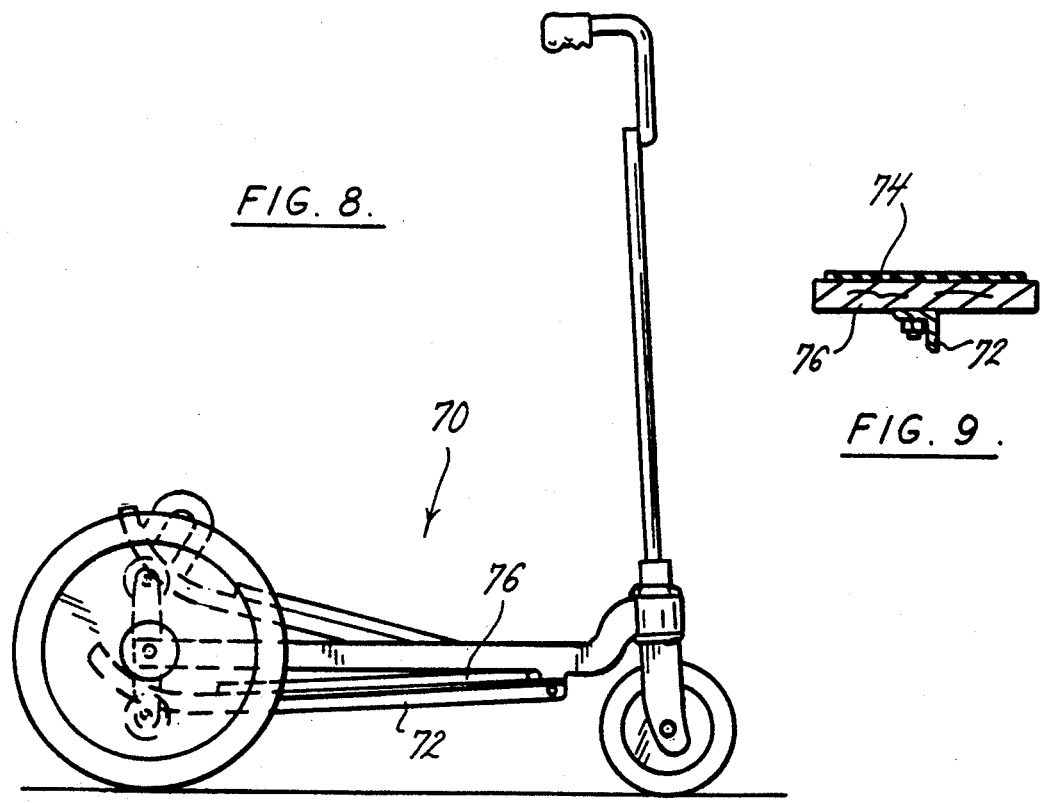
FIG. 8.
FIG. 9.

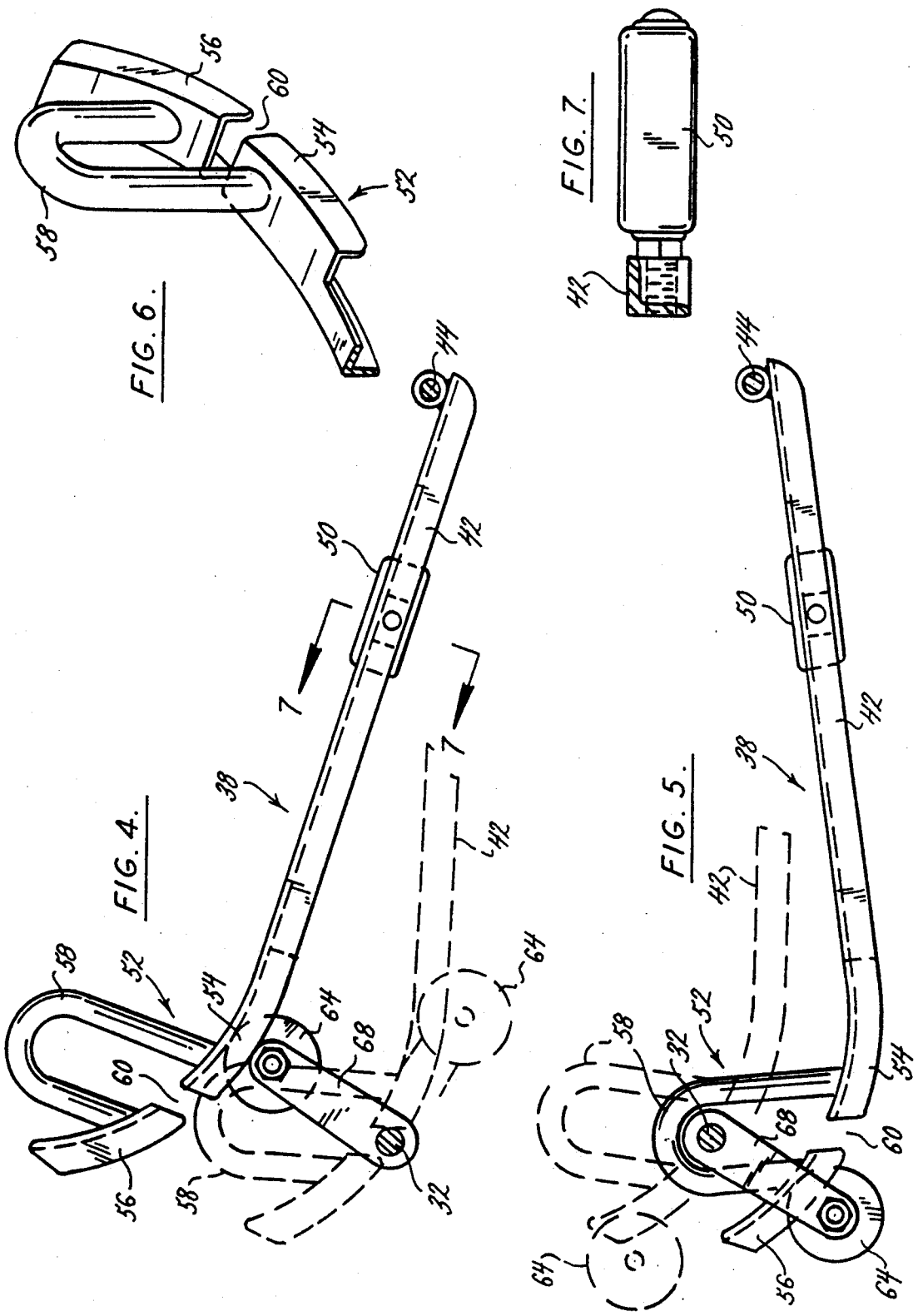

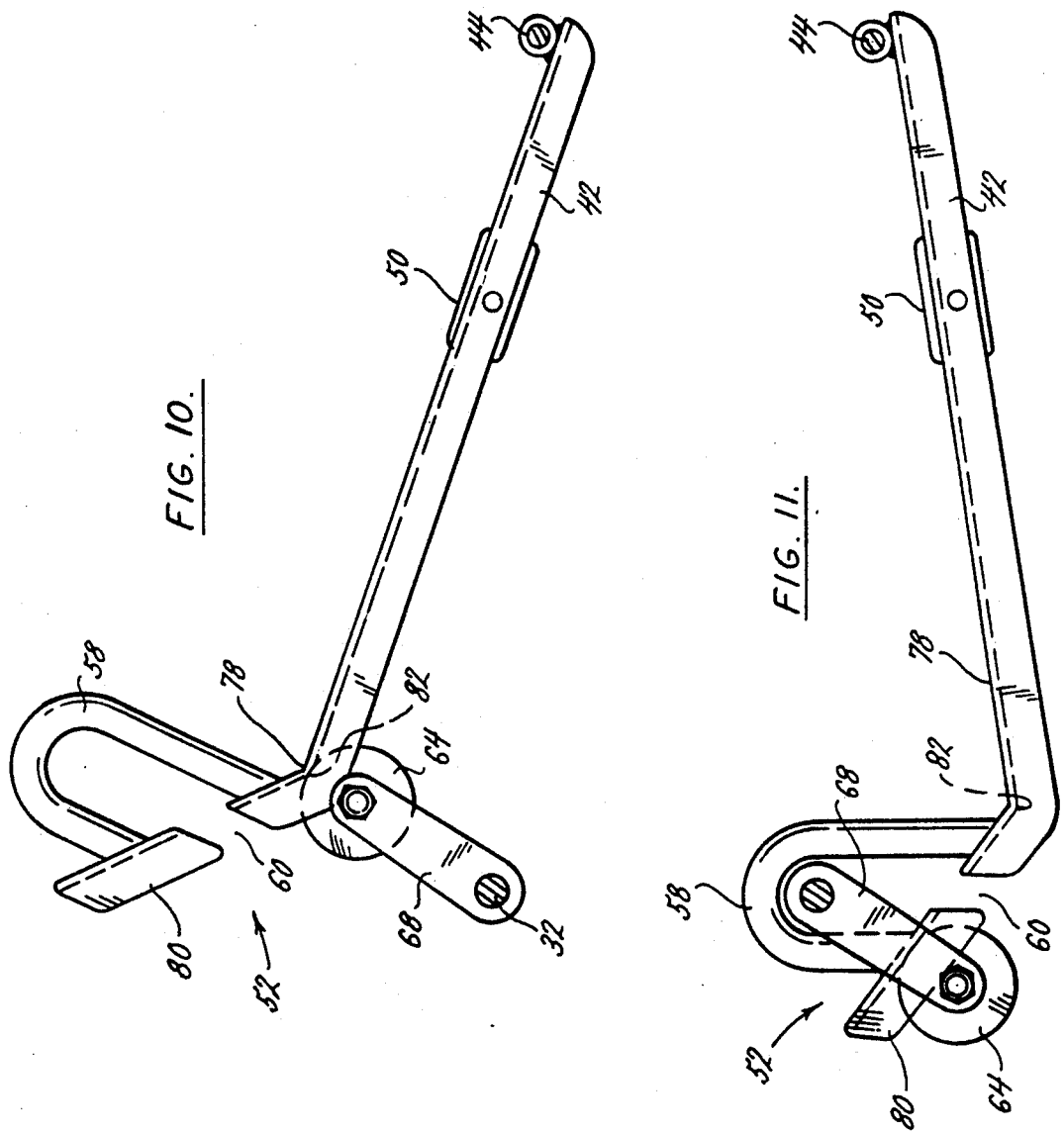

TOY VEHICLE WITH TRACK AND ROLLER DRIVE TRAIN

This is a continuation of copending application Ser. No. 435,336 filed on Nov. 13, 1989, now abandoned.

BACKGROUND AND SUMMARY OF THE INVENTION

There are many toy vehicles for children in the prior art which utilize many different kinds of drive mechanisms to transfer the reciprocating action of a child's legs into rotating motion for drive wheels. Many of these are quite complicated and represent a testament to the designer's fascination with gears, cams, levers, and other elements of a mechanical engineer's arsenal in translating reciprocating motion into rotating motion. Unfortunately, many of these are quite impractical to withstand the rigors of a child's vehicle while at the same time exhibiting the performance demanded by both parents and children. Parents desire that their children have toys which are relatively safe, simple in design so as to minimize breakage or maintenance, and relatively inexpensive. On the other hand, children desire their toy vehicles to provide speed, agility, and relative ease in moving from forward to reverse travel.

To solve these and other problems in the prior art, the inventors herein have succeeded in designing and developing a self-propelled vehicle which can be utilized both by children and by adults for recreational purposes. The toy vehicle may be fashioned in different embodiments and still utilize the track and roller drive train which is elegantly simple and readily adaptable to these different configurations. The track and roller drive train is unique in that it utilizes a pair of pivotally mounted pedal arms each of which has a split track at its rearward end which rides on a roller. Each of two rollers are pivotally attached to an associated roller arm with the roller arms being mounted on opposite sides of the axle. Each split track is essentially comprised of a pair of ramps which have a gap between them for straddling the axle as the roller and its associated roller arm rotates about the axle. This construction permits the peddle arms to reciprocate "through" the axle and follow the roller as it rotates a full 360° about the axle.

Still another feature of the split track is its non-linear roller surface. By simple geometry it can be seen that a non-linear roller surface permits each track and roller to drive the axle through a full 180° so as to minimize any lulls or interruptions between strokes of the pedal arms. Additionally, the non-linear roller surface provides equal torque and thrust in both the forward and rearward directions. There are two embodiments disclosed for the non-linear track. One of these utilizes a curvilinear track and the other utilizes a V-shaped track with a 45° angle.

The track and roller drive mechanism is elegantly simple in design with a reduced number of moving parts over most drive mechanisms of the prior art which ensures its reliability. Furthermore, the drive mechanism can be readily accessible for ease in maintenance or repair. For the child's part, the mechanical advantage offered by the drive train provides quick and agile movement both in the forward and reverse directions. As only the forward or rear mechanism, a tricycle is readily adaptable to this drive mechanism which provides balance as well as versatility.

While the principal advantages and features of the invention have been described above, a greater understanding thereof may be attained by referring to the drawings and description of the preferred embodiment which follows.

BRIEF DESCRIPTION OF THE DRAWINGS

FIG. 1 is a side view of a tricycle with the track and roller drive train of the present invention;

FIG. 2 is a cross-sectional view taken along the plane of line 2—2 in FIG. 1 and detailing the pivotal mount of the forward end of each pedal arm;

FIG. 3 is a rear view of the tricycle of FIG. 1 and partially broken away to detail the mounting of the rollers to the rear axle;

FIG. 4 is a side view of a pedal arm with its track and associated roller showing movement thereof through 90° of axle travel;

FIG. 5 is a side view of a pedal arm with its track and associated roller showing movement thereof through 90° of axle travel;

FIG. 6 is a perspective view of a track partially broken away to detail a portion of the roller surface;

FIG. 7 is a partial cross-sectional view taken along the plane of line 7—7 in FIG. 4 of a roller arm detailing the mounting of a pedal thereto;

FIG. 8 is a side view of a scooter vehicle with the track and roller drive train of the present invention utilized therein;

FIG. 9 is a cross-sectional view of a pedal arm for the scooter vehicle of FIG. 8;

FIG. 10 is a side view of a pedal arm with a V-shaped track and associated roller showing movement thereof through 90° of axle travel; and FIG. 11 is a side view of a pedal arm with a V-shaped track and associated roller showing movement thereof through 90° of axle travel.

DETAILED DESCRIPTION OF THE PREFERRED EMBODIMENT

As shown in FIG. 1, a toy vehicle such as a tricycle 20 has a supporting framework 22 which includes a generally longitudinally extending main support bar 24 which has a collar 26 at its forward end for rotatably supporting a front wheel 28 and handle bars 30 and an axle 32 at its rear end which supports a pair of rear wheels 34. Also, framework 22 may provide for mounting an adjustable seat 36 for supporting a rider as he sits thereon and propels the vehicle 20 through a track and roller drive train 38.

The track and roller drive train 38 is best shown in FIGS. 2-6 and includes a pair of pedal arms 40, 42 which are pivotally mounted at their forward end by an axle 44 supported from support bar 24 by a pair of struts 46. A pair of pedals 48, 50 (see FIG. 7) are rotatably attached to each of pedal arms 40, 42, as is known in the prior art.

Each pedal arm 40, 42 has a track 52 as shown in FIG. 6 which includes a pair of ramps 54, 56 which are joined by a bracket member 58, with ramps or tracks 54, 56 forming a generally non-linear, curvilinear, roller surface with a gap 60 therebetween for straddling the axle 32. A pair of rollers 62, 64 are pivotally mounted by a pair of roller arms 66, 68 at opposite sides of axle 32. Roller arms 66, 68 are themselves welded to the axle 32 so that as they are caused to move by tracks 52, axle 32 is caused to rotate.

The relative movement between tracks 52, roller 62, and axle 332 may be best explained by referring to FIGS. 4 and 5. As shown in FIG. 4, as pedal arm 42 is moved downward, roller 62 rotates as it is driven along the arcuate roller surface of track 52. Track 52 and pedal arm 42 continue downwardly until roller 62 is tangential to the roller surface of track 52. Similarly, at the top of each pedal arm stroke roller 62 "breaks over" and moves from a passive condition to a drive condition at the point that roller 62 is tangential and perpendicular to the roller surface of track 52. These two positions are best shown in FIGS. 4 and 5. As can be appreciated by comparing these two figures, track 52 acts to drive roller 62 and, hence, axle 32 through substantially 180° of rotation. Therefore, each pedal arm, track, and roller drives the axle through 180° of rotation on each stroke such that the axle 32 is constantly being driven. This is true for movement of the pedal arms, rollers, and tracks in either the forward or rearward direction.

Still another advantage of the generally curvilinear track 52 of the preferred embodiment is that by appropriately angling the ramps 54, 56 the thrust required, or the torque generated, by the drive train is substantially equal throughout each stroke in either the forward or rearward direction which smooths the ride and eliminates any "dead" spots for the rider in his powering of the vehicle. With the gap between ramps, the pedal arm reciprocates symmetrically about the axle which provides an economy of motion and maximum mechanical advantage for the length of roller arms 66, 68. This maximizes the torque generated by the rider with a relatively short stroke for each pedal, thereby maximizing the available speed for the vehicle.

In another embodiment as shown in FIGS. 8 and 9, a scooter 70 can be used with the same track and roller drive mechanism 72, the exception being that no seat is provided for the rider and instead the rider stands on platforms 74 supported by a wider pedal arm 76. In this embodiment, the weight of the rider can be conveniently shifted from side to side as an aid in reciprocating the pedal arms 72 which, perhaps, makes it easier for a rider to propel a vehicle. On the other hand, greater convenience and comfort may be available with the tricycle embodiment as shown in FIGS. 1–7.

As shown in FIGS. 10 and 11, the tracks 52 may be compound angled instead of curvilinear as shown in FIGS. 4 and 5. In this version, one of the ramps 78 has an angle of approximately 45° formed therein while the other ramp 80 is substantially straight and forms an extension of the 45° of ramp 78. The apex 82 is positioned at the "break over" point where the track 52 moves from a passive condition to a driving condition as the axle rotates in either direction. This is the uppermost position of pedal arm 42 and is shown in FIG. 10. The position shown in FIG. 11 is where the pedal arm 42 is at its lowest position and the roller 62 is perpendicular to the ramp 80.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a self-propelled vehicle, the vehicle being adapted to support a rider thereon as it is propelled, the vehicle having a drive axle rotatably mounted to a supporting framework, the axle having a pair of wheels rotatably mounted thereto, each of said wheels being mounted generally at an outboard end of said axle and said axle extending substantially in a straight line between said wheels, the improvement comprising a track and roller drive linkage including at least one roller and one track interconnected between the drive axle and the framework and mounted inboard of said wheels, each roller being mounted to the axle and each track being mounted to the framework, and means for propelling the vehicle by imparting relative movement between said track and said roller.

2. The vehicle of claim 1 wherein each track is comprised of a pair of ramps, and a gap between said ramps for straddling the axle.

3. The vehicle of claim 2 wherein each track is pivotally mounted to the framework so that as it is pivoted about its mount relative movement is imparted between the track and roller and the vehicle is thereby propelled.

4. The vehicle of claim 3 wherein the track and roller drive linkage includes a pair of rollers mounted to the axle and a track associated with each of said rollers.

5. The vehicle of claim 4 wherein said rollers are mounted substantially on opposite sides of the axle.

6. The vehicle of claim 5 wherein each track and roller has means for driving the axle through substantially 180°.

7. The vehicle of claim 6 wherein the axle driving means includes a non-linear track.

8. The vehicle of claim 7 wherein the track has a curvilinear roller surface.

9. The vehicle of claim 7 wherein the track has a compound angled roller surface.

10. The vehicle of claim 6 wherein each track is mounted substantially near the rearward end of a pedal arm and the forward end of the pedal arm comprises the pivotal mount to the framework.

11. A self-propelled vehicle, the vehicle being adapted to support a rider thereon as it is propelled, the vehicle having a supporting framework, a plurality of wheels rotatably mounted to a drive axle, and a drive train interconnected between the supporting framework and the drive axle, said drive axle extending substantially in a straight line between said plurality of wheels, said drive train being connected to the drive axle at a point between said plurality of wheels, and said drive train including a pair of rollers mounted to the axle, each of said rollers having an associated track, and means for imparting relative motion between said tracks and rollers to thereby drive the vehicle.

12. The vehicle of claim 11 wherein the motion imparting means further comprises a pair of pivotally mounted arms, each of said tracks being supported substantially near the end of an associated pivotally mounted arm, and further comprising a pedal means associated with each of said arms to aid the rider in pivoting said arms to thereby cause relative movement between the tracks and rollers and drive the vehicle.

13. The vehicle of claim 12 wherein each of said tracks has means for straddling the axle as the arms are pivoted.

14. The vehicle of claim 14 wherein said drive train has means for balancing the torque required to pivot the arms for either forward or rearward movement.

15. The vehicle of claim 14 wherein said axle straddling means comprises a pair of separated ramps, said ramps straddling the axle as the track is pivoted downwardly by its associated arm.

16. The vehicle of claim 15 wherein said torque balancing means comprises a non-linear roller surface for each of said tracks.

17. The vehicle of claim 16 wherein the track has a curvilinear roller surface.

18. The vehicle of claim 16 wherein the track has a compound angled roller surface.

19. The vehicle of claim 12 wherein said drive train further comprises means for rotating the axle approximately 180° either in the forward or rearward direction for each full pivot of either arm.

20. The vehicle of claim 19 wherein each of said tracks comprises a pair of separated ramps, said ramps straddling the axle as the track is pivoted downwardly by its associated arm.

21. The vehicle of claim 20 wherein said 180° rotating means comprises a non-linear roller surface for each of said tracks.

22. The vehicle of claim 21 wherein the track has a curvilinear roller surface.

23. The vehicle of claim 21 wherein the track has a compound angled roller surface.

24. A self-propelled vehicle, the vehicle being adapted to support a rider thereon as it is propelled, the vehicle including a framework with a pair of drive wheels rotatably supported by a drive axle, and a track and roller drive train interconnected between the framework and the drive axle, said drive train including a pair of rollers mounted to the drive axle and spaced substantially opposite each other, each of said rollers having an associated track mounted near the end of a pedal arm, the forward ends of said pedal arms being pivotally mounted to the framework and having a pair of pedals mounted thereon, each of said tracks being comprised of a pair of ramps separated by a gap so that as the pedal arms are alternately pivoted downward the ramps straddle the axle.

25. The vehicle of claim 24 wherein said ramps have non-linear roller surfaces to provide rotation of the axle for substantially 180° for each full stroke of each pedal arm in either the forward or rearward direction.

* * * * *